Patented Jan. 11, 1944

2,339,163

UNITED STATES PATENT OFFICE 2,339,163

PROTECTIVE CEMENT COATING

William V. Friedlaender and Norman C. Ludwig, Chicago, Ill., assignors to The Atlas Lumnite Cement Company, a corporation of New Jersey No Drawing. Application December 3, 1940,- Serial No. 368,392

6 Claims. (Cl. 106—104)

This invention relates to cement mixtures or paints and particularly to an improved cement mixture or paint for application to surfaces, particularly metallic surfaces, so as to provide a protective coating therefor.

Various types of cements such as Portland and other analogous hydraulic cements, have been suggested and used for protecting surfaces, such as steel, from corrosion by the atmosphere and from the attack by acid vapors and chemicals. While some of these cements have been satisfactory, others were unsatisfactory in that after setting they were not durable and were not properly bonded to the surface.

In the use of Portland cement or any other similar cement as a protective coating, lime is released during the setting and hardening of the same and consequently in some instances lime has been added thereto to supply that which has been lost through setting and hardening. In the present instance, it is proposed to use a calcium aluminate cement which releases alumina instead of lime during the setting and hardening for the reason that such a cement provides a coating much more resistant to certain corrosive solutions than would be the case if lime or a lime releasing cement were used.

In a number of cases a slurry composed of a calcium aluminate cement and water has been successfully applied to steel, and after setting has bonded well with the steel forming a hard durable coat. But we have found that the conditions under which such successful coatings may be obtained have not been well understood and that protective coatings can be made from calcium aluminate cement only when the hydration process is completed sufficiently to hydrate a large percentage of the cement particles. The hydration of the particles is limited under normal circumstances in a slurry applied as a thin coating because of the rapid evaporation of the water. It is desirable in the making of a calcium aluminate cement coating to retard this water evaporation in order that the cement particles will have a better chance to become hydrated. It has also been found that when the evaporation of mixing water is too rapid, there is a shrinkage or contraction of the coating and this ruins the bond of the coating to its base. Furthermore, it is considered desirable to have the calcium aluminate cement coating harden within two to four hours after application.

Accordingly it is one of the objects of the present invention to provide an improved cement coating or paint for use in protecting surfaces which is durable and one which will be properly bonded to the surface to which it is applied and, at the same time, a cement coating having all the primary requisites of a good protective coating.

It is another object of the invention to provide a cement coating or paint for use in protecting surfaces which can be easily and efficiently applied thereto and one that sets and becomes hardened and dustless only a few hours after its application.

It is still another object of this invention to provide an improved cement coating or paint for use in protecting surfaces in which the hardening and drying thereof is accelerated and at the same time one in which a smooth adherent coating is obtained which will not crack after it has set and become hardened.

Various other objects and advantages of our invention will be more apparent during the course of the following specification and will be particularly pointed out in the appended claims.

According to the present invention, there is provided a cement coating or paint for use in making thin coatings on concrete, brick, roofing surfaces and the like, and which is particularly adaptable for coating impervious surfaces such as metallic surfaces and the like, so as to protect the same from attack, particularly by corrosion. This improved cement coating comprises a fluid slurry consisting of a mixture of a calcium aluminate cement, an inorganic material to accelerate the setting of the coating so as to rapidly harden the slurry, a material, preferably casein, to limit the rate of evaporation of the water in the slurry so as to prevent too rapid drying of the same and consequent abnormal shrinkage thereof, and water.

The type of cement it is proposed to use in the practice of the present invention is characterized by calcium oxide and aluminum oxide in such proportions as to form calcium aluminates as principal constituents with the sum of the calcium and aluminum oxides consisting of approximately 70 to 100%. The relative proportions of the calcium and aluminum oxides are preferably further adjusted one to the other so as to produce calcium aluminates represented by the formulae $CaO.Al_2O_3$ and $5CaO.3Al_2O_3$ rather than those more or less basic. Since combinations of calcium aluminate cement and Portland cement are quick setting, Portland cement may be included in the mixture if desired up to about 20% by weight of the calcium aluminate cement used. It may also be advantageous to include other mineral substances, such as granulated or pulverized blast furnace slag or earthy materials for the purpose of altering the surface texture of the coating or so as to provide a filler therefor. Also it may be desired to add coloring material, such as colored metal oxides or other pigments. However, if such materials are included, the proportions cannot definitely be stated but in any event should not be great enough to impair the setting and hardening properties of the basic mixture of the calcium aluminate cement, the inorganic material and casein, and also of such quantities so as not to affect the durability of the coating when hardened.

The inorganic material used for such purpose and classified as set accelerators for calcium aluminate cement, is selected from the group of materials consisting of calcium chloride, calcium sulphate, magnesium sulphate, ferric sulphate, aluminum sulphate and carbonates of the alkali metals.

It has been found that finely ground casein in the amounts of from 1 to 5% by weight of the cement and a quantity of one of the inorganic materials as heretofore mentioned in the amounts of 1 to 5% by weight of the cement, will react in the slurry in a satisfactory manner. It has been found that approximately 1% by weight of finely ground casein and 2% by weight of calcium chloride provide a suitable slurry to obtain the desired effects.

It will be understood that calcium aluminate cement has been selected because of its quick hardening property and its resistance to attack by sulphates in solution, by which it differs from Portland or other hydraulic cements. Calcium chloride or any of the other inorganic materials is added to accelerate hardening but, by itself, it causes the cement coating to shrink and crack as hardening proceeds. Casein by itself imparts a degree of plasticity and elasticity which prevents cracking and promotes the formation of a smooth adherent coating, but greatly retards setting and hardening. By including both the inorganic material and the casein in the slurry, the benefits of each are obtained, namely, quick hardening and smooth adherent coating without cracks, and each counteracts the defects of the other. Because of the hygroscopic character of calcium chloride and capacity of casein to hold water, both doubtless contribute jointly to the retention of water.

The cement coating is applied to the surface to be coated in the following manner:

The surface to be coated is first cleaned so as to be free from paint and corrosion by any suitable means such as by sandblasting, filing, or by rubbing with an abrasive, or by washing with dilute acid and removing the excess acid with water and then drying the surface.

The casein is preferably finely ground so that it will pass through a 200 mesh screen or sieve. The slurry is then made by mixing together approximately 100 parts by weight of a calcium aluminate cement, one part by weight of casein, and two parts by weight of calcium chloride, or one of the other inorganic materials selected from the group mentioned. If the calcium chloride is used, it is preferably of the commercial flake form and contains approximately 80% anhydride and 20% water. To these materials there is added sufficient water so that when the materials are thoroughly mixed and agitated, a smoothly flowing slurry will be provided. The amount of water needed will vary according to the fineness and the nature of the cement desired, but will usually be between 30 and 40 pounds per 100 pounds of cement, and it has been found that 35 pounds of water per 100 pounds of cement is satisfactory and very effective. If desired, the pulverized casein and the calcium chloride or inorganic material may be ground with the cement in the process of manufacture. Also they may be added if desired to the water prior to the mixing of the dry cement. In fact, it does not necessarily matter when the respective materials are added to the mixture as long as they are all incorporated therein so as to produce a homogeneous mixture in the slurry.

After the slurry has been mixed as above described, it is applied to the cleaned surface preferably by spraying the same thereon so that the coating is uniformly smooth. However, if desired, it may be applied with a brush, thus producing a surface showing brush marks which may be preferred as a textured surface. The thickness of the coating may be varied as desired but it has been found that a ⅛" coating affords adequate protection against corrosion under ordinary conditions of exposure. However, thinner coatings may be sufficient, provided enough slurry is applied to produce a continuous layer entirely covering the surface being coated.

After the slurry has been applied to the surface so as to provide the desired coating thereon, some time is required for the setting to proceed until it becomes hardened and the reactions involved in setting require water in excess of that supplied in the slurry mixture. Therefore, the freshly applied coating is kept under observation and when it is apparent from the disappearance of the liquid water and the hardening of the coating that more water is needed, it is supplied preferably in the form of a fine mist or a spray, or, if desired, with a brush. The exact time necessary to apply more water to the coating on the surface depends on such factors as the speed with which setting takes place and evaporation and cannot be definitely stated to suit all conditions. By experimentation, one skilled in the art will be able to estimate the proper time at which to apply the excess water to the coating under the particular conditions which the coating has been applied. It has been found, however, that in the case of a slurry consisting of 100 parts by weight of calcium aluminate cement, one part by weight of casein, two parts by weight of calcium chloride and 35 parts by weight of water, additional water is supplied to the coating at approximately two hours after the slurry has been applied to the surface being coated. Thereafter applications of water must be made at frequent intervals until the cement coating is finally set and hardened. In most cases usually two or three of such applications will suffice but, in any event, such applications need not extend beyond a period of 24 hours, although application of water beyond final hardening will not harm the coating.

It will be understood that in case the cement of our invention is used for coating surfaces other than metallic or impervious surfaces, such as brick or stone masonry, cement concrete, or the like, account must be taken of the capacity of such materials to absorb water. If the slurry of calcium aluminate cement, casein and calcium chloride should be applied to these while in dry condition, their capacity for absorbing water will abstrict from the slurry so much of the water it contains as to interfere seriously with, or prevent entirely, the hardening of the coating applied.

Therefore, the surface is first saturated with water, and on this saturated surface the slurry is applied in the manner above described, and the same procedure is observed during the period while it is setting and hardening.

From the above description of our invention, it will be apparent that many modifications of the same may be devised within the scope thereof and all such modifications are contemplated as may fall within the scope of the appended claims.

We claim:

1. A cement for application to surfaces for protecting the same, comprising a fluid slurry consisting of a mixture of approximately 100 parts by weight of calcium aluminate cement, from 1 to 5% by weight of an inorganic material selected from the group consisting of calcium chloride, calcium sulphate, magnesium sulphate, ferric sulphate, aluminum sulphate and carbonates of alkali metals to accelerate the setting of the slurry, from 1 to 5% by weight of the cement, of casein which is adapted to limit the rate of evaporation of the water in the slurry so as to prevent too rapid drying of the slurry and consequent abnormal shrinkage thereof, and sufficient water so that the mixture has suitable consistency for applying the slurry to the surface to be coated.

2. A cement for application to surfaces for protecting the same, comprising a fluid slurry consisting of a mixture of approximately 100 parts by weight of calcium aluminate cement, approximately two parts by weight of an inorganic material selected from the group consisting of calcium chloride, calcium sulphate, magnesium sulphate, ferric sulphate, aluminum sulphate and carbonates of alkali metals to accelerate the setting of the slurry, approximately one part by weight of casein which is adapted to limit the rate of evaporation of the water in the slurry so as to prevent too rapid drying of the slurry and consequent abnormal shrinkage thereof, and approximately 35 parts by weight of water so that the mixture has suitable consistency for applying the slurry to the surface to be coated.

3. A cement for application to surfaces for protecting the same, comprising a fluid slurry consisting of a mixture of approximately 100 parts by weight of calcium aluminate cement, approximately 2% by weight of the cement, of an inorganic material selected from the group consisting of calcium chloride, calcium sulphate, magnesium sulphate, ferric sulphate, aluminum sulphate and carbonates of alkali metals to accelerate the setting of the slurry, approximately 1% by weight of the cement, of finely ground casein which is adapted to limit the rate of evaporation of the water in the slurry so as to prevent too rapid drying of the slurry and consequent abnormal shrinkage thereof, and sufficient water so that the mixture has suitable consistency for applying the slurry to the surface to be coated.

4. A fluid slurry cement for application to surfaces for protecting the same comprising a mixture of approximately 100 parts by weight of calcium aluminate cement which is characterized by having the total calcium and aluminum oxides therein consisting of approximately from 70 to 100 per cent, approximately from 1 to 5 per cent by weight of the cement, of an inorganic material selected from the group consisting of calcium chloride, calcium sulphate, magnesium sulphate, ferric sulphate, aluminum sulphate, and carbonates of alkali metals, approximately from 1 to 5 per cent by weight of the cement, of casein, and approximately 35 per cent by weight of water so that the mixture has a suitable consistency for applying the slurry to the surface to be coated, said inorganic material adapted to accelerate the setting and hardening of the slurry and said casein adapted to limit the rate of evaporation of the water in the slurry so as to prevent too rapid drying thereof and consequent abnormal shrinkage of the slurry cement upon drying.

5. A fluid slurry cement for application to surfaces for protecting the same which consists of approximately 100 parts by weight of calcium aluminate cement, approximately two parts by weight of an inorganic material which is adapted to accelerate the setting of the slurry so as to rapidly harden the same, approximately one part by weight of an organic material which is adapted to limit the rate of evaporation of the water in the slurry and consequent abnormal shrinkage thereof, and approximately from 30 to 40 parts by weight of water so that the mixture has a suitable consistency for applying the slurry to the surface to be coated.

6. A fluid slurry cement for application to surfaces for protecting the same as defined in claim 5 where the inorganic material consists of a material selected from the group consisting of calcium chloride, calcium sulphate, magnesium sulphate, ferric sulphate, aluminum sulphate, and carbonates of alkali metals, and the organic material consists of casein.

NORMAN C. LUDWIG.
WILLIAM V. FRIEDLAENDER.